Feb. 4, 1930.     P. L. CLARK     1,745,528
RADIOGRAPHIC APPARATUS
Filed Jan. 20, 1927     4 Sheets-Sheet 1

INVENTOR
Paul L. Clark.

Feb. 4, 1930.                 P. L. CLARK                 1,745,528
                         RADIOGRAPHIC APPARATUS
                         Filed Jan. 20, 1927          4 Sheets-Sheet 4

INVENTOR
Paul L. Clark.

UNITED STATES PATENT OFFICE

PAUL L. CLARK, OF BROOKLYN, NEW YORK

RADIOGRAPHIC APPARATUS

Application filed January 20, 1927. Serial No. 162,311.

My invention relates to improvements in radiographic apparatus, and particularly to that class of apparatus in which pictures are transmitted from a local station to a distant station either by wire or radio, as understood in the art. One object of the present invention is to provide an improved method of synchronizing the receiving apparatus with the sending apparatus; another object is to provide an improved optical system; a third object is to provide novel means for transmitting colored pictures by radio; a fourth object is to provide an improved illuminating means for the subjects to be transmitted; another object is to provide means for producing a beam of light of intensity substantially proportional to the characteristics of the received signal impulses and dividing said beam longitudinally into two or more beams having different directions, one of the beams being used for visual light signals and one or more for the control of an electric circuit in the local apparatus of the receiver, such as shown, for example, in Figs. 11, 12, 14 and 15 of the present drawings, and in Figs. 53, 60, etc., of my Patent 1,678,974, the present application including and comprising a part of the aforesaid patent in which an oscillograph is controlled by received signals, said oscillograph directing light rays for observation or registration upon a screen or upon a grid composed of light-transmitting and arresting members, and also (when the signal energy applied to the oscillograph differs from a given value or characteristics) directing rays to photoelectric means electrically connected to the energizing circuit of the oscillograph for maintaining the mirror in a mean zero (or neutral) position relative to its swing. In the application this regulating means is applied to maintain the rotating mirror or mirrors of the explorer in a given mean position controlled either independently or jointly by the received and local signals, local light beams or local electrical connections, or interrelated combinations of the several available local and signal energies. Additional novel features are shown in the specification and drawings and further pointed out in the claims. Means are hereinafter described showing the method of and apparatus for synchronizing the receiver with the transmitter through the agency of an electrical controlling circuit actuated by both a local and a distant energizing or signal producing apparatus, or by the application of the instantaneous resultant values of two or more combined sources of electrical or radiant energy one or more of which is derived from or is proportional to the received signal strength or frequency, or governed by characteristics of the received signals. Several preferred methods of attaining synchronization are fully described and shown in the drawings, including methods of control by means of adjacent picture points or areas, or by adjacent or spaced lines on the picture field or focal plane of the view transmitted, the advantage lying in the attainment of a synchronization superior to that accomplished by heretofore used types of apparatus. In order to secure this improved result, I prefer to use a grid or light chopper in the receiver as well as in the transmitter, and by means of variable registration of beams of radiant energy in the chopper apertures in the transmitter as compared to the registration of beams produced by the explorer system of the receiver, to secure a device providing an electrical potential somewhat proportional to the out-of-phasing of the receiver and apply the energy of said potential to speed control for the receiver motor, said motor controlling the speed of the explorer elements. I am aware that choppers are old as applied to transmitters, such being shown in Patent 1,161,734; the said patent does not, however, show a chopper in the receiver apparatus, nor is any attempt made therein to synchronize the receiver by means of a local source of light and with suitable optical means as disclosed herein.

Pictures composed of black and white and intermediate gray points are hereinafter termed "shadow" views; pictures of flat objects or having a flat focal plane or having merely length and breadth are termed "flat" views; colored views composed of two or more complementary colors are termed "colored" views.

In the drawings similar numerals refer to similar parts, unless otherwise stated. Fig. 19 is a diagrammatic plan of part of a receiver in which two photoelectric cells are opposed to regulate the auxiliary field coils, and neither of the coils is controlled directly by the incoming signals; Fig. 20 is a section on 20—20, Fig. 19; Fig. 21 is a section on 21—21, Fig. 19, showing a typical grid, chopper or aperture plate for use in synchronizing; Fig. 22 is a section similar to Fig. 20, in which three photoelectric cells are used; Fig. 23 is a detail of a grid for use with Fig. 22; Fig. 24 is a diagram of connections for Fig. 22; Figs. 25 and 26 are modifications of the grids of Fig. 21; Figs. 27 to 31, inclusive, show typical wave forms produced by the interposition of the grids of Figs. 21, 23, 25 and 26 between the exploring mirrors and the photoelectric cells due to variable amounts of light being passed by the grids (owing to synchronizing conditions) to said cells.

Figures 1, 2, 3, 4, 5, 6, 7, 8, 9, 10, 11:
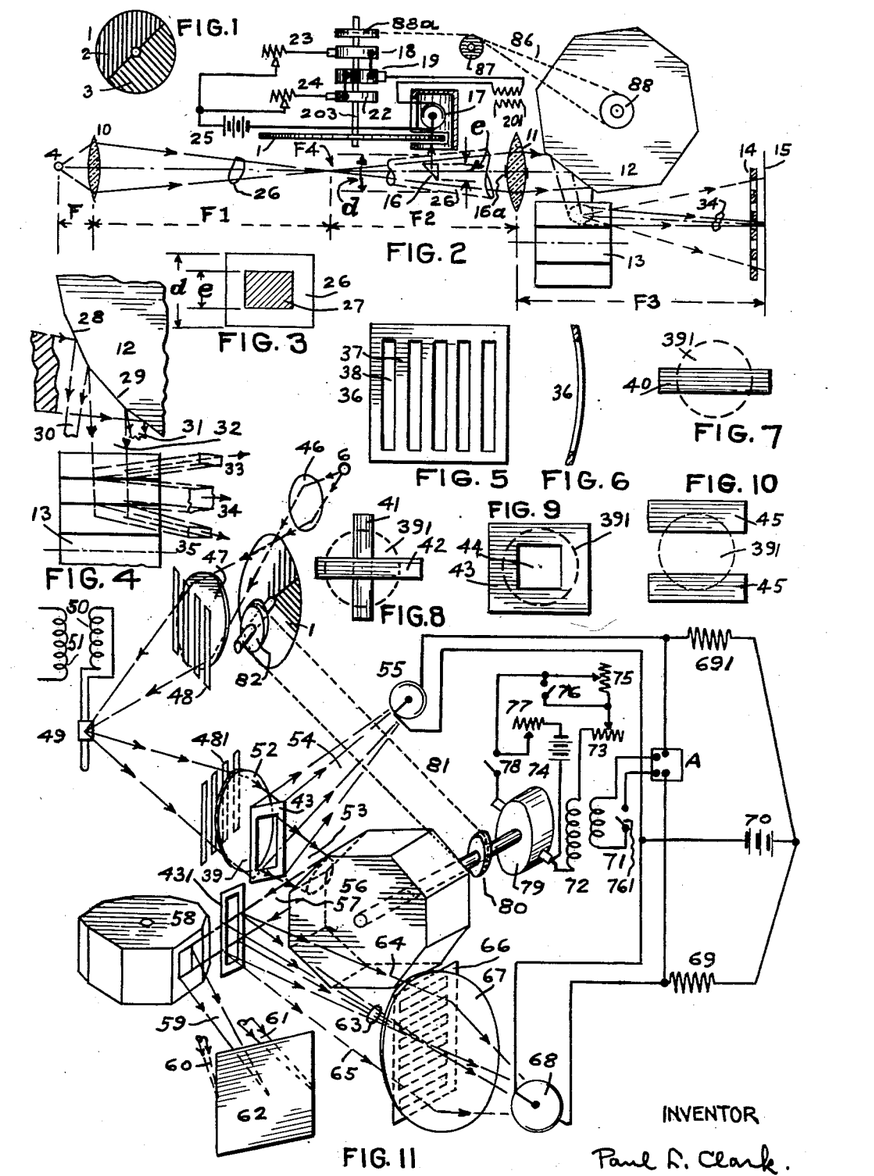
Fig. 1 is a detail of a disk comprising transparent sectors of complementary color screens, for use both in the receiver and transmitter.
Fig. 2 is a plan of a part of a transmitter for colored flat views, including synchronizing signal transmission features.
Fig. 3 is a vertical cross-section of the light beam through a plane near the prism 16, Fig. 2.
Fig. 4 is a detail of a part of the light distribution from the rotatable exploring mirrors of Figs. 2, 11, etc.
Fig. 5 is a front elevation and Fig. 6 is a vertical cross-section of a typical concave grid or chopper used in Figs. 2, 12, etc.
Fig. 7 is a detail of a small mirror disposed in a beam of light to deflect a part of the rays in the beam to fall upon suitable photoelectric means.
Figs. 8, 9 and 10 are modifications of Fig. 7.
Fig. 11 is a perspective diagrammatic view of a receiving apparatus showing the paths of light rays and one modification of the proposed optical and electrical system in which the field strength of an electric motor is varied by means of an auxiliary field winding, said winding being in a circuit controlled by photoelectric signals, the receiver to be used in connection with the transmitter of Fig. 2, or with transmitters of heretofore used design.

In Fig. 1 the disk 1 is composed of transparent colored areas 2, 3, each comprising one of a plurality of complementary colors, as red and green glass or celluloid, so that as the disk is rapidly revolved and a beam of white light directed through it, the light as viewed after passage through the disk appears through the persistence of vision as a homogeneous white light. The disk may comprise three or more complementary colors, if desired, as used in the presentation of colored or stereoscopic moving pictures derived from transparent pictures as used in the moving picture art, it being understood that usually it is necessary for a spectator to wear goggles of complementary colored glass matching the shutter color screen colors of the projector when showing stereoscopic views on a projection screen. The apparatus herein described is of such character that it is possible to send either colored or stereoscopic views with apparatus very similar in construction.

Figures 12, 18:
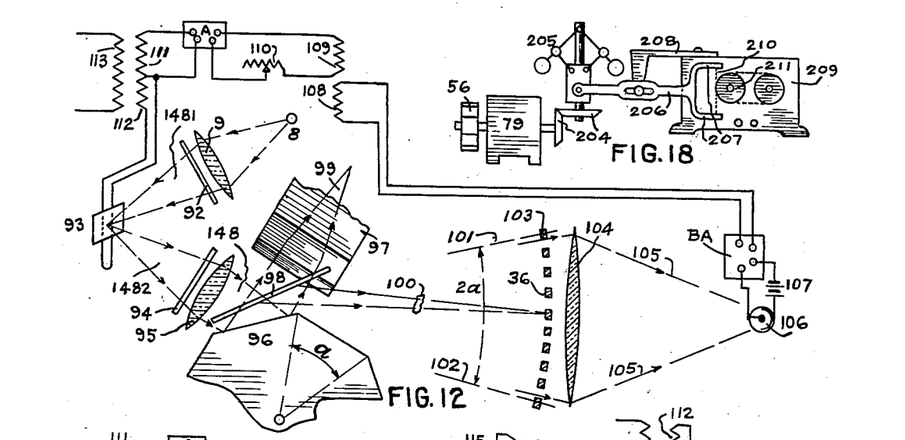
Fig. 12 is a diagrammatic view of a modified receiver in which the auxiliary field winding of Fig. 11 is replaced by two coils one being controlled by the incoming signals and the other by a local circuit including a photoelectric cell.
Fig. 18 is a front elevation showing means for simultaneously regulating both the motor speed and tuning control and other controls of a radio receiving set.

In Figs. 2 and 3 a lens 10 receives rays from a light source 4 and condenses them to a focus $F^4$ from which they diverge to an objective lens 11 which converges the beam to the exploring disks 12, 13 [driven by a suitable motor (not shown)], which distribute the light over the grid or chopper 14 (described in connection with Fig. 5) disposed adjacent to or at the view or the focal plane of the view to be transmitted, the width of the beam 34 at its intersection with the grid being about the width of an aperture in said grid, this condition being determined by proper design of the optical system and by limiting the size either of the light source or the image of the source at $F^4$, so that as the explorer system is rapidly rotated the beam 34 successively traverses apertures and bars from left to right thus alternately illuminating slightly separated points or areas of the view to be sent. Since there is a clear path along the optical axis of the system for the light rays to illuminate a given area on the focal plane or view, and the speed of light is great relative to the speed of the apparatus, it is seen that light rays from the illuminated area will traverse (for all practical purposes) the same path as the illuminating rays, so that certain parts of the optical system are functioning both ways; and this characteristic is utilized to provide light signal impulses for the electrical transmission of the shade or color values of the view at the sending station. To utilize these back-reflected rays a small reflecting prism or mirror 16 is put in the beam 26, the envelope of the outer rays of this beam being of greater diameter than that of the envelope or cone of rays generated by a point source, the arrangement here shown necessitating the use of a source of appreciable size. The prism 16 should for best results be located away from the point $F^4$ and should subtend a fraction of the solid angle of the beam 26, the relative area occupied by said prism being shown at 22, Fig. 3, in which $d = \sqrt{2} \, x \, e$ for either rectangular or round sources, in which case about one-third of the view area illuminated (by the projected explorer light) reflects rays back at such an angle as to be intercepted by the reflecting surface of the prism 16. Black opaque spots $16^a$ are put on the axis of the lens 11 to prevent specular reflection to the prism 16 of irrelevant light derived from the source 4. The light rays falling upon the prism pass through the color screen 1 and fall upon the cell 17 connected through a suitable battery and slip rings 18 (see Fig. 35) connected to segments of a commutator 19 connected to transformer 201 connected to the cell. A belt 86 passing over the idler 87 and pulleys 88, $88^a$ rotates the color mechanism comprising the commutator, slip rings and disk at a speed to cause this mechanism to register with the explorers so that for each complete cycle of the explorers embracing a predetermined portion of the picture points to be transmitted the color system rotates a given amount (usually a half revolution per complete cycle of the explorers) sufficient to interpose one of the color segments in the path of the rays to the cell. On account of the variable effect of light of different colors on photoelectric cells it is evident the signals of equal visual effect and of different color will not produce signals of correspondingly relative signal strength electrically; and to overcome this inherent characteristic of such cells I provide adjustable resistances 23, 24, one in series with each of the commutator segments which register exactly in time and position with the color segments on the disk 1, so that by adjusting these resistances it is feasible to balance up the circuits to obtain signals of proper relative strengths regardless of the color. It is of course understood that suitable amplifying apparatus and broadcasting equipment (not shown) is to be attached to the transformer circuit, in order to transmit to the distant receiving equipment. The number of bars and apertures in the grid 14 should be the same, ordinarily, as a similar grid used in the receiver to be synchronized, such as shown in Figs. 11 and 12, so that for synchronization the frequency of signals produced by the explorer and grid of the transmitter should bear a definite relationship to the frequency of the explorer and coacting grids of the receiver. In order to clarify the description it is assumed for general conditions that the explorers, color disks and grids are of identical design in both the transmitter and receiver, although as is well known, this condition is by no means essential as different types of apparatus are commonly used in conjunction, the only restriction being that the relative position and timing of picture points be the same in both stations. It is thus evident that the beam in the receiver, as 100, Fig. 12, travels across each grid bar and aperture simultaneously with the passage of the light in the beam 34, Fig. 2, across corresponding bars and apertures of the transmitter; and when this condition is met the sender and receiver are in exact synchronism and step. The present application does not treat the matter of securing or providing adjusting means for keeping the apparatus in step, since means for accomplishing this are well known in the art. The lens 11 has one focus at the point $F^4$ and the other focus at or near the grid 14 (the distance between the lens and grid being measured along the optical axis of the beam from the lens to the grid). The total arc of transverse travel of the limiting rays of the light reflected by the mirrors of the explorer system should ordinarily be such as to simultaneously embrace an equal number of bars and apertures in both receiver and transmitter, in order to secure exact timing and position. The advantage of the illuminating means lies in the fact that a small and intense beam of light is caused to rapidly explore the subject to be illuminated for transmission, and since this exploring beam travels so fast as to register upon a given spot for only a minute fraction of time the average intensity of light (through the whole cycle) is extremely low with a resulting minimum of visual fatigue to the actors or persons whose radiographs are to be transmitted, and at the same time providing an instantaneous brilliant illumination of each view area for registration upon the cell 17. One or more of the exploring disks should contain twenty or more mirrors in order to reduce the speed of the system and for other objects known in the art. If the side of the grid nearest the explorer be a dull black it is evident that the beam 34 may be of greater width than that of the apertures; the prism 16 should, however, subtend an area which includes only the light which is reflected back from a view area the width of which equals the combined widths of one grid bar and one adjacent aperture. The foci of the lens 10 are F and $F^1$, and of the lens 11 the foci are $F^2$ and $F^3$ (measured along the optical axis).

In Fig. 4 the incident light beam embraces two or more mirrors on the explorer 12, the rays falling upon the central mirror being the only light rays reflected for utilization upon the coacting explorer 13 the mirrors on which subtend such angles that the beam 32 reflected from the functioning mirror 29 embraces one complete mirror chord and parts of each of the chords of one mirror on each side of the aforesaid mirror, which is the only mirror functioning to direct the beam 34 upon the grid 14 (Fig. 2), this construction being shown also in Fig. 30 of my Patent 1,678,974, the four light beams 30, 31, 33, 35 being lost for use in sending signals but being utilized for synchronizing of the receiver. Either disk of the explorer may be the high or low speed element, it being necessary merely to explore the whole field covered by the chopper which may be circular or of any type to produce wave forms suitable for signal transmission.

In Figs. 5 and 6 the radius of the general concave surface of the chopper is equal approximately to the length of the beam 100, Fig. 12, and the center of curvature is such that the beam 100 strikes each part of the chopper normal to the surface of said chopper. The widths of the opaque bars 37 and transparent apertures 38 should be about uniform or lie between great circles subtending equal angles with respect to the center of curvature of the chopper. The number of elements on each chopper determines the sharpness of definition of picture point transmission, and the bars and apertures need not necessarily be of equal width, but designed to prevent a trailing effect due to inertia of the photoelectric cells.

In Fig. 7 the small plane mirror 40 is placed centrally to intercept a part of the beam 391 (corresponding to the beam 39, Fig. 11) and deflect light for control purposes, as described in connection with Figs. 11, 12, etc.

In Fig. 8 two mirrors 41, 42, are placed at right angles to intercept equal amounts of light from the beam 391, for control purposes, these mirrors being used to take the place of mirrors 43, 431, Fig. 11.

In Fig. 9 the mirror 43 has a rectangular aperture 44 permitting rays contained in the beam 391 to pass through to the explorer, as in Fig. 11, and to deflect certain parts of the beam to suitably disposed photoelectric cells.

In Fig. 10 two mirrors 45 are placed to intercept rays near the periphery of the beam for deflection to the synchronizing control means. These mirrors may be placed at right angles to each other and at different parts of the beam and need not be located in the same vertical plane, the object being merely to show that equal amounts of light are reflected by each mirror.

In Fig. 11 the fixed light source 6, lenses 46, 47, grid 48, oscillograph 49, grid 481, and lens 52 comprise the fixed light valve controlled by incoming signals from the transformer coil 51, induced in the coil 50, the direction of the light being shown by the arrowed lines. The mirror 43 is placed in the beam near the lens 52 and permits some light to reach the explorer 56 and intercepts and deflects some light to fall upon the cell 55 so that the amount of light falling thereupon is proportional to the signal strength and also to the intensity of light in the beam 39. The beam 53 which passes through aperture mirror 43 and falls upon the explorer 56 contains rays which are directed partly upon the coacting explorer 58 and partly upon the mirror 431 which reflects them to fall upon a chopper 66 (for producing periodic waves of a frequency depending upon that of the incoming signals combined with the effect produced by subjecting the said incoming signals to a secondary frequency as the light values of these signals is reciprocated or oscillated over the chopper at a speed dependent upon the speed of the explorer 56) placed near a lens 67 which directs said rays to a cell 68. The explorer 58 directs an exploring pencil or pencils of rays 59 to form the received image upon the optical plane, or projection screen 62. The chopper 66 should be similar to chopper 14, Fig. 2, so that when the receiver and transmitter are synchronized and in step, the pencils of light rays 63, Fig. 11, and 34, Fig. 2, pass through corresponding apertures or register upon corresponding bars of said choppers. Ordinarily the optical system should be designed to produce an image of the source at the surface of the chopper and also upon plane 62. Cells 55 and 68 are connected in arms of a Wheatstone bridge; in the remaining two arms are inserted the variable resistances 69, 691; and in the circuit ordinarily occupied by the galvanometer I place an amplifier or relay A, to increase the energy of the combined feeble currents or potentials generated or controlled by the cells and utilize the resultant increased energy in an auxiliary opposing field coil 71, on the motor 79, the regular field coil 72, being used for manual speed control. The operation of synchronizing the apparatus of Figs. 2 and 11, is as follows: start up motor in the usual manner leaving switch 76 open and switch 761 open, thereby putting impedance 75 in series with the field coil 72; slowly bring motor up to synchronous speed by visual observation of the picture points registered on screen by the explorers; close switches 76 and 761 (in the opposing field coil circuit) so that any current in coil 71 will tend to weaken the motor field and thereby speed up the motor to or beyond synchronous speed. As long as the photoelectric effect of each of the cells 55, 68 is opposite and balanced, no current will flow into the amplifier A, and the motor will start to decelerate; but as soon as the deceleration reaches a magnitude to cause the explorer 56 to lag sufficiently so that the beam 63 lags behind its true synchronized position on the chopper 66, the value of the signal light in the beam 63, after traversing the chopper, is different from the value of the light in the beam 54 (directed from the light valve and not influenced by the speed of the explorer system). For purposes of clearness, consider that the cells 55 and 68 are of identical characteristics, and that the instantaneous amount, color and density of light in the beams 54 and 63 are identical, a condition generally desirable; now if the chopper 66 be removed the effect of the light on the bridge, cell and amplifier circuits should be zero. The chopper 66 should be so placed that when the high speed explorer unit is out of step,—with relation to a given picture point or line (and not out of step as applied to the view as a whole) by a fraction of a point, as registered upon the chopper,—the signal light in the beam 63 will not register exactly with any given aperture, and therefore less light will reach the cell 68 than reaches the cell 55, causing current to flow in the coil 71 and speed up the motor. This apparatus will not maintain exact synchronous speed, but will produce an oscillating speed by supplying increments of power intermittently to speed up a motor running at slightly less than synchronous speed on a steady power supply, the above being a principle somewhat similar to that now used in the art: heretofore used apparatus has not employed the means of control above described which consists in combining a portion of the incoming signal energy undistorted, with a portion of the signal energy distorted by the explorer, and appling the resultant combined instantaneous energy for speed control. Neither does previous apparatus use a synchronizing method which consists in uniting a plurality of electrical or photoelectrical energies of different frequency and amplifying the resultant energy so produced to vary the motor speed within relatively narrow limits, and maintain an exploring beam within an error of amplitude deviating merely by the width of approximately one-half a picture point area each side of its correct synchronous registration position transverse the chopper of the receiver, regardless of signal strength or frequency, so that predetermined phase displacements of the receiver explorer relative to the transmitter explorer are transformed into electrical currents of suitable value, and applied to rephase the receiver explorer. Typical curves showing resultant values of combined waves produced by out-of-phasing conditions, are shown in Figs. 27, 28, 29 and 30. The color disk 1 is placed in the beam between the lenses 46 and 47, and rotated synchronously with respect to the corresponding disk in Fig. 2, by means of pulleys 82, 80, and belt 81, making one-half revolution for each complete explorer single color cycle. It is also feasible to apply the resultant energy of the cells 55, 68, to strengthen instead of weaken the motor field and normally excite the motor field for over-speed, the idea of the auxiliary field excitation means, herein disclosed, being merely to provide a novel automatic device—acting within narrow limits—to supply an increment of power or energy slightly affecting the motor speed. Other types of balancing schemes other than the Wheatstone bridge may be used. If no heterodyning of local and received signals is produced it indicates that the motor speed is too critical, and the shunt or separately excited field should be manually adjusted to bring the speed either above or below the critical or synchronous speed, in order for the local photoelectric control to provide complete and instantaneous compensation for undesirable or predetermined speed fluctuations. It is also possible to use dissimilar choppers, say, a one-hundred bar chopper in the transmitter and a ninety-nine bar chopper in the receiver; which for synchronous conditions will cause a lag of one point in the delineation of each transverse line of the picture, this lag of one point on each successive line, being compensated for, say, one per cent of increased motor speed for the next line, so that the loss occurring in one line may be made up in the next line, or approximations thereof. The strength of a series of impulses starting from a slight difference of phase and building up to a maximum strength when the receiver is out-of-phase a full one-half picture point (or any other desired amount) should be sufficient or sufficiently amplified to exert a corrective force to speed the motor up beyond the speed produced by the manually controlled field, as shown in Fig. 11 (with an opposing auxiliary field). The auxiliary control should therefore provide means for varying the speed within a range equal approximately to twice the difference between synchronous speed and normal or average manually controlled speed; in other words, the speed should oscillate about synchronous speed considered as a neutral. For example, suppose that synchronous speed is one-hundred R. P. S., and the motor is run by the manual control at ninety-nine R. P. S., then, the auxiliary photoelectric control circuits should supply automatically sufficient energy to speed the motor up to one-hundred one R. P. S., or even higher, depending somewhat on the average signal strength and frequency.

In Fig. 12 the incoming signals pass through transformer coil 113 and are induced in the double secondary coils 111, 112, connected respectively to an amplifier A, and to oscillograph 93, the high side of the amplifier being connected to auxiliary field coil 109 through a variable resistance 110. Opposed to coil 109 is a coil 108 connected to the high side of an amplifier BA, the low side of which is connected to the cell 106 disposed to be illuminated at approximately signal frequency by rays passing through a chopper 36. Light from the source or aerial image 8 passes through the lens 91, grid 92, to the oscillograph mirror 93, to grid 94, lens 95, (the above combination comprising a typical light valve) passes to explorer 96, partly to explorer 97 which reflects the rays 99 to a screen (not shown). Certain of the rays reflected from the explorer 96 are intercepted by the mirror 98 (similar to mirror 40, Fig. 7) and reflected to chopper 36 in the form of a converging beam 100, oscillating transverse the chopper between the limits 101, 102, bisecting the outside chopper bars. The chopper should have either exactly or approximately the same number of bars as the transmitter chopper, Fig. 2, in order to produce predetermined relative frequencies of the chopped beams, or a given relationship between the signal frequency of the transmitter and the explorer frequency of the receiver. The combined effect of coils 108, 109, is the equivalent of the effect of the coil 71, Fig. 11, to produce either a maximum or zero effect at speeds varying slightly from synchronism. The angle $2^a$ subtended by the chopper should be about twice the angle $a$ subtended by each explorer mirror, it being evident that the frequency of interference of the beam 100 with the chopper bars is dependent upon the angular velocity of the explorer and also upon the number of bars within the exploring angle $2^a$. The disk 96 may be either the high or low speed explorer, or an explorer independent of the regular view exploring equipment, the only object being to have a means for causing the beam to travel proportionally with the travel and periodicity of the receiver exploring mechanism, since it is obvious that the light rays comprising the beam 100 are used only for synchronizing purposes and are reflected from the view exploring device merely to minimize the number of parts, and thereby slightly simplify the apparatus. The chopper 36 may be plane or cylindrical, and the bars should be so spaced that as the pencil 100 travels clockwise over the limiting angle and crosses the centerline 102 (i. e., as it leaves registration with the chopper), a pencil from the explorer mirror next adjacent to that which reflects the pencil 100 will reflect its beam (or the beam which would be produced provided a visual signal of requisite strength is being transmitted) so as to register simultaneously with the centerline 101 of the bar 103, each explorer mirror during the rotation of the disk 96 successively reflecting the fluctuating light signals (from zero to maximum brilliancy) to traverse at substantially equal intervals that portion of the chopper included within the angle $2^a$. The amplifying apparatus and all related circuits may obviously be tuned for conformity with the received signals, as in audio reception, and one-half of the incoming waves may be used for visual signals and the other half for synchronizing purposes by the well-known application of one or more rectifying tubes (not shown) or a rectifying tube may be placed directly in the shunt field circuit, or in the auxiliary field circuit, as desired.

Figures 13, 14, 15, 16, 17, 32, 33, 34:
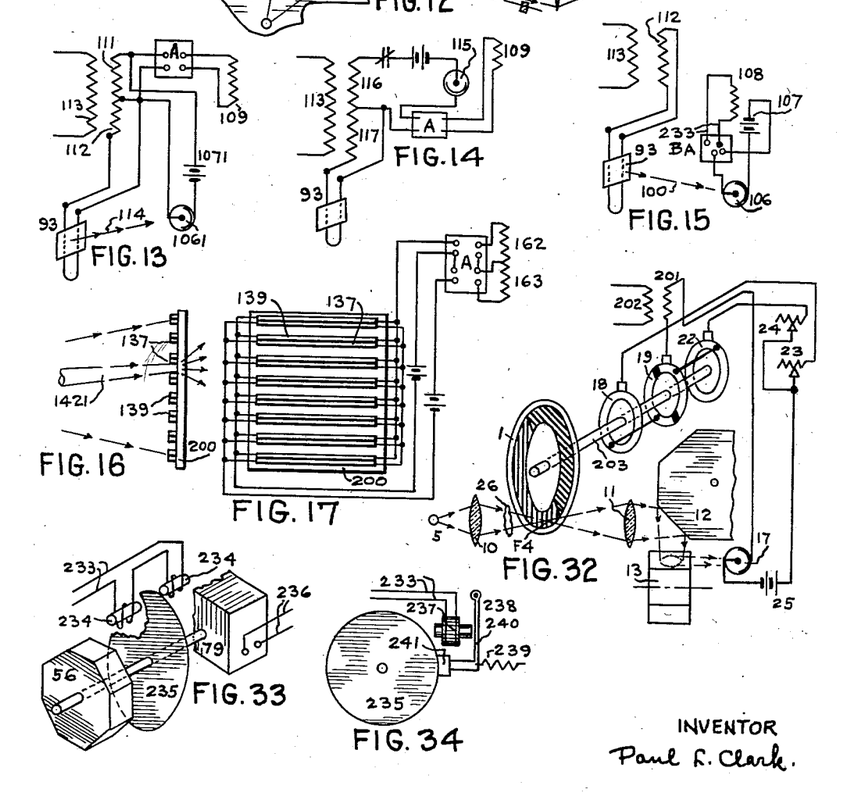
Fig. 13 is a diagram of electrical connections showing a photoelectric cell connected in multiple with a portion of a divided secondary coil of a transformer in the incoming signal circuit.
Fig. 14 is a modification showing a photoelectric cell and transformer coil connected in series.
Fig. 15 shows the same connection as Fig. 12 except that a part of the circuit of Fig. 12 is omitted.
Fig. 16 is a vertical section and Fig. 17 is a rear elevation of a projection screen provided with photoelectric cells, such cells being hereinafter termed "cells"
Fig. 32 is a view partly in perspective showing additional details of the color apparatus.
Fig. 33 is a perspective view showing a control utilizing an electro-magnetic field disposed to damp a rotating metal disk attached to the spindle of the driving motor of the explorer elements, similar to the damping means used on watt-hour meters.
Fig. 34 is a modification showing a tangential brake applied to check the speed of the rotating explorers.

In Fig. 13, the cell 106 and coil 111, being connected in multiple, will give a maximum, intermediate, or minimum value when the apparatus is synchronized, thereby varying the strength and controlling the excitation of the field coil 109, depending upon the cell polarity connections.

In Fig. 14 the cell 115 and transformer secondary coil 116 are connected to mutually oppose or assist each other, the terminals of the circuit going to the low side of the amplifier, the high side going to coil 109.

In Fig. 15 the signal circuit 112 is connected to the oscillograph 93 which reflects the rays in a path 100 (comparable to the valve and light train of Fig. 12) to the cell 106 which controls the signals through the amplifier to the coil 108, so that if the optical system is out of synchronism, energy is applied to said coil to restore the speed of the motor, as in Fig. 11.

Figures 19, 20, 21, 22, 23, 24, 25, 26, 27, 28, 29:
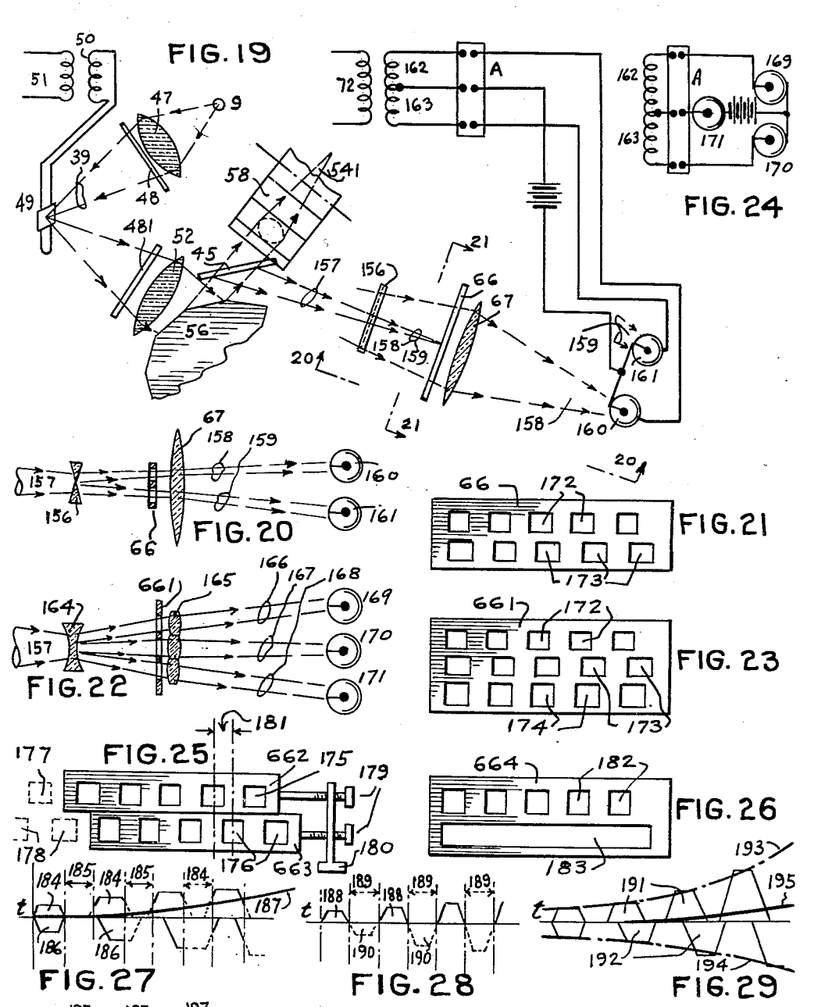

In Figs. 19, 20 and 21 the valve and optical system are substantially the same as in Fig. 12, some exceptions being hereinafter noted. The mirror 45 reflects rays from the explorer 56 in the form of a beam 157 to the bifurcated prism 156 which divides and refracts the rays in two beams (Fig. 20) to fall upon a chopper 66 having two parallel rows of apertures (Fig. 21), those in the upper row being identical with those in the transmitter chopper, and those in the lower row being spaced on greater centerlines, so that if the beam cuts the upper apertures at a given speed and traverses the lower apertures at the same speed a smaller quantity of light passes through the lower apertures in traversing the entire chopper width than passes through the upper apertures; so that when the receiver is run above synchronism a greater amount of light passes through one set of apertures than through the other, causing an unbalance of light on the cells 160, 161, and in the circuits connected thereto, and through the amplifier to the auxiliary field coils 162, 163, thereby producing a resultant energy applied to said coils, as shown at 187, Fig. 27. Ordinarily there should be one more or one less aperture, per given chopper width, in the upper than in the lower row, depending upon whether the motor field 72 is manually set for motor overspeed or under-spe l, the shape of the curve representing the mean resultant value of a series of combined synchronous and asynchronous (or portions of displaced synchronous) signals being somewhat as shown in Figs. 27 and 29. The spacing and size of the apertures in the upper row should be such as to insure registration of the oscillating light beam 158 with successive apertures in exact or nearly exact duplicate with the registration of the exploring beam in the transmitter with the transmitter signal producing means. Choppers shown in Figs. 23, 25, etc., may be substituted for the chopper 66, depending on the number of cells used, and also upon the type of auxiliary or manual speed control, and upon the speed regulation, whether an increment of power is to be added to or subtracted from the motive energy and if the local receiver control is designed to merely speed the motor momentarily above synchronous speed and alternately and automatically slow the motor down below speed; or if manual regulation be applied to maintain the speed slightly above or below the actual synchronous speed, so that the automatic energizing means is functioning only to supply the necessary deficiency of power to secure either a deceleration or acceleration.

In Figs. 22, 23 and 24 the rays 157 enter the lens 164 which fans the light out to embrace each of a series of apertures and to fall upon cells disposed to receive the rays, the cells 169, 170, 171 being suitably connected to an amplifier A, Fig. 24. The spacing of the apertures in the lower row 174 is the mean of the spacing of apertures on the two upper rows, so that when synchronized no current flows in the field coils. If the speed is too slow, the direction of current in the coils should speed up the motor, and vice versa. For a perfectly balanced or synchronized system the resultant should approximate zero. The apertures are differently but uniformly spaced in each row, the widths of apertures in all rows being slightly different. The light may be of different intensity upon the different cells, and balancing means connected in circuit, as in Fig. 2.

In Fig. 25 the chopper consists of two substantially identical transversely adjustable members 662, 663, permitting them to be accurately adjusted and staggered for signal synchronization, the aperture size and spacing corresponding to that of the transmitting chopper. The continuation of the wave band is shown at 178, so that each successive cycle traverses a complete arc comprising an equal fractional part of a circle; somewhat as described in connection with Fig. 12. When this adjustable chopper is used in place of chopper 66, Fig. 20, using two cells, the motor speed should be manually controlled as close to synchronism as possible, with the phasing and step adjusted to register each wave crest or portion thereof between the centerlines of adjacent upper and lower apertures, as shown, for example, in the space 181 for a single instantaneous ideal registration for exact work. The amplifier should function without inertia.

In Fig. 26 the chopper 664 when used in place of the chopper 66, Figs. 11, 20, etc., and with two cells, will produce energy variations similar to those of the cells of Fig. 11, since the light passing through the continuous aperture 183 will register at received signal frequency, regardless of the speed of the receiver optical system, whereas, the light passing through the apertures 182 is affected by said speed.

In Fig. 27 the positive waves 184 are typical of the received signals, while the negative waves 186 are characteristic of locally produced (or optically influenced received signals) at the receiver, the resultant curve 187 being the summation of values of light as passed by the choppers, above-described, or the values of the waves or energy in the transformer coils, as 111, Fig. 12; 116, Fig. 14; etc. The position of the chopper bars is shown at 185, and the apertures at 184, clearly showing that when the bars intercept some of the light,—caused by variable registration of the exploring pencil with the apertures of said chopper,—a light, energy, or speed difference curve 187 results; and by the proper transformation of the values shown by this curve into variations of an electrical speed-control circuit, it is possible to govern the motor phasing and speed within narrow limits. The waves 184, 186 are shown opposed to each other; assisting waves will naturally produce a steeper curve than 187, until the motor speed passes the critical synchronous speed, the curve dropping after passing this critical point (but not necessarily dropping or starting to drop at the actual instant of passing said point), so that a portion of a curve covering several periods of automatic speed correction should be of the oscillatory form somewhat as shown in Fig. 31, the instantaneous power increment applied for speed acceleration or deceleration being substantially proportional to the simultaneous deviation of the motor from true synchronism, or proportional to the deviation from some point relative to the position of the actual synchronous rotation.

In Fig. 28, although the waves 188 are shown positive and the waves 190 are shown negative, it is evident that, even if both series of waves are of the same sign, the minimum resultant (when using the chopper of Fig. 25 and two cells, as in Figs. 11, 19, etc.) will occur when the synchronizing pencils are in the position 181, Fig. 25, since variations causing the displacement of the pencils relative to the position 181 will produce an unbalance in the two-cell circuits, with a reversal of direction in the auxiliary field coils (causing either a strengthening or weakening of the motor field, depending upon the direction of passage of the beam across the chopper and also upon whether the position of the beam band 181 is displaced to the right or left relative to the neutral position shown in Fig. 25).

In Fig. 29 the resultant waves 193, 194, produced when using the chopper 66, Fig. 21, are combined to yield the resultant curve 195 which is the actual value of the correction applicable over a given interval for speed increment control.

Figure 30:
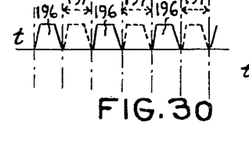

In Fig. 30 the waves 196 represent the values produced when the light pencil is traveling below synchronism, in which case, say, the pencil successively registers almost exactly in the apertures 175, Fig. 25, i. e., to the left of the position 181. The waves 197 represent the waves which are not produced owing to the fact that when the pencil registers exactly with the upper apertures in the member 66² the light comprising the lower pencil, which is in direct vertical alinement with the upper pencil, will be entirely shut off from the cell, as 161, Fig. 20. The reverse condition holds if the motor is over-speeded, in which case the signal pencils which are deflected by the explorer will successively register, say, over a portion of, or over the entire apertures in the member 66³, so that no light or a small amount of light passes through the upper apertures 175, thereby slowing down the motor. The chopper shown in Fig. 25 may obviously be used in any of the modifications which use two cells, as in Figs. 11 and 19, so that part of the light is alternately interrupted from successive cells or intercepted variably to a single cell. The combination of a fixed light source, exploring means, choppers disposed to intercept light from said exploring means, and photoelectric means to receive the light rays, together with means controlled by the aforesaid combination to vary the explorer speed, constitutes a light valve control which may be used for purposes other than deflecting an oscillograph mirror or controlling motor speed; and I have here described only these two embodiments of the invention, since other applications are well known in the arts.

In Fig. 31 the envelope 199 is one typical form of a sustained control wave produced when the chopper is used in the apparatus of Figs. 11, 12, 19, etc., the separate or split waves corresponding to phase difference impulses at signal frequency being shown at 198, one or more of which may be considered as corresponding to a single wave, as 184, 186, Fig. 27, or 188, 190, Fig. 28, etc., and these values although shown positive may be negative or approach or equal zero at moments of synchronism. The envelope 99 may also be considered as the resultant wave indicating the instantaneous values of controlling energy or signal strength applied to a pole-tip coils or to the braking devices of Figs. 33 and 34. When using the various heterodyning or differential light valve means herein shown, the spacing and dimensions of the chopper should be a function of the frequency of the beat-wave crests produced by heterodyning, or a function of the lower or higher frequency oscillation.

In Figs. 16 and 17, pairs of cells 137, 139 are spaced,—the same as the grid bars, Fig. 5,—on the rear of a translucent projection screen 200, this complete device being designed to take the place of a grid, cells and screen shown in Fig. 11, so that all light from the explorers 58 may be directed in the form of a single oscillating pencil thereupon, alternate cells being connected in multiple and through an amplifier to field coils 162, 163, the insulated cells here shown being of selenium, and the light beam from the explorer being shown at 142¹.

In Fig. 18 the explorer 56 is driven by a motor 79 geared to a speed-control centrifugal governor 205 connected to a rocker arm 206 attached to a cord or wire 210, used as a belt, operating speed or tuning controls connected to the motor, said controls comprising part of the radio-frequency amplifier set 209; so that as the motor speed varies the governor produces a proportionate tuning control in the circuits connected to said set, corresponding to the signal frequency. Consider that the frequency is, say, one-million cycles; since the explorer speed is of necessity a factor of the signal speed and the explorer and motor revolve at a constant relative ratio, it is seen that the set should be tuned automatically by the governor for receiving one-million cycle signals.

In Fig. 32 the color disk 1 intersects the light beam at the focal point $F^4$ so that the object is illuminated alternately and successively in each of the complementary colors, the light path being as shown by the dotted lines. Except for this difference in construction, the mechanism is similar to that shown in Fig. 2.

In Fig. 33 the motor 79 drives an explorer 56 and metal disk 235 disposed between the magnets 234 energized by a local signal circuit designed to produce energy therein when the local explorer signal speed exceeds the speed of the received signals, it being assumed that the motor speed should be manually controlled slightly above synchronism, as understood in the art, so that the local signals exert a braking effect upon the motor, said braking effect persisting until approximate synchronous speed is attained owing to inertia produced in the moving mass, or until the speed is slightly below synchronism, in order to produce an effect known as "hunting," which means an oscillation relative to a given synchronous condition. The wires 233 correspond to similar wires in Fig. 15, and it should be understood that generally the arrangement of cell circuits, choppers, explorers, cells and whatever additional or auxiliary apparatus is used, should be designed and built to produce electrical energy proportional approximately to the motor speed or overspeed, said energy being applied to the wires 233, and the magnets being designed to produce the necessary retardation of the motor speed during the existence and application of predetermined portions of the energy controlled by said signals.

In Fig. 34 the brake 241 is pressed against the disk 235 proportional to the excitation of the magnet 237 to retard an overspeeded motor, as in Fig. 33. Variable movement of the brake arm 240 may also be applied to operate the power increment device or relay shown in my Patent 1,648,042, for speed incrementing.

Figure 35:
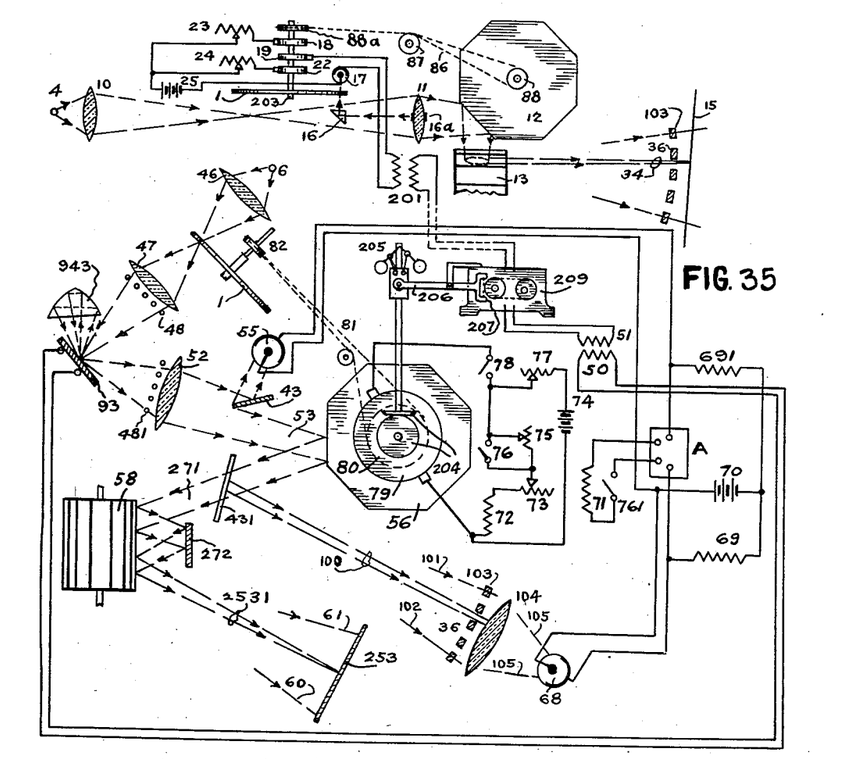
Fig. 35 is a general assembly and diagrammatic view showing a system comprising a transmitter and receiver and circuits therefor.

In Fig. 35 the arrangement of the apparatus is such as to show a complete transmitting and receiving optical and electrical system, the several components comprising this assembly being described and illustrated in the several detail views.

Figure 36:
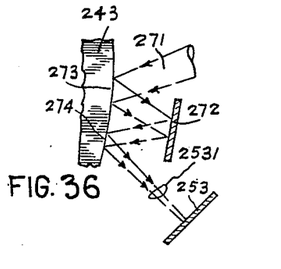
Fig. 36 is a plan view of a portion of a rotating explorer element reflecting light to a plane mirror which reflects the light back upon said explorer in order to increase the angle of dispersion and therefore cover a relatively larger area on the focal plane or projection screen.

In Fig. 36 a mirror 272 is placed to receive rays reflected from the explorer by the element 273, and reflect these rays back upon an element 274, which triple reflection causes the exploring beam 2531 to oscillate over twice the angle caused by the reflection from the element 273, and therefore cover a relatively wider area on the screen 253.

Figure 37:
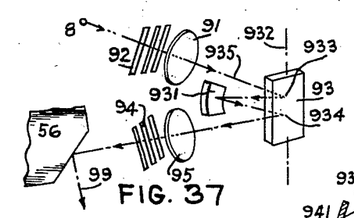
Figs. 37 and 38 are details of a modified light valve.

In Fig. 37 the axis of the grid 92 and lens 91 is directly above the axis of the grid 94 and lens 95, so that the said axes lie in a common vertical plane to which the bars and apertures of the said grids are parallel, said plane also including the axis 932 of oscillation of the oscillograph mirror 93 and, if desired, intersecting the axis of the concave spherical, ellipsoidal, paraboloidal or plane mirror 931; so that as the mirror 93 swings either to right or left, light rays derived from the source 8 are received upon the point 933 on the mirror 93 and reflected to the mirror 931 which reflects these rays back to a point 934 on the mirror 93 which reflects them through the lens 95 and grid 94 to the explorer 56, the advantage of this arrangement lying in the attainment of a double angle of reflection for a given displacement of the mirror 93. In order to produce a tripling of the angle a second mirror (not shown) similar to 931 may be placed to receive the rays reflected from the point 934, in which case the axis of the light train would somewhat resemble the axis of the train of the rays reflected from the mirror 931. Any number of mirrors similar to but not necessarily identical with 931 may be used, and it should not be understood that these mirrors need all be disposed with their axes in the same vertical plane, since if the mirror 93 is normally oblique to the axis 935 of the beams from the source 8, it is evident that the center of the mirror 931 must lie off to one side of the vertical plane which includes the said axis 935; and it is evident, also, that the grid 94 and lens 95 may be off to one side or wherever desired so that their axis lies on approximately the axis of the light train. The mirror 931 may be ellipsoidal or spherical, such as used in oscillographs or galvanometers. The mirror 93 may be parabolic, if desired, and with a plane mirror at 931, the curvature of the said parabolic mirror being such as to parallel the rays diverged due to the spread of the beam caused by the size of the light source, or the mirrors may both be curved or both plane to accomplish this result. Synchronizing signals may also be sent independently of and between the picture signals, thereby utilizing portions of the carrier or modulated waves not used for picture point values. Synchronizing may also be accomplished by a utilization of the dark spots or bars, all of which under synchronous conditions should register with dark spots or bars both in receiver and transmitter, so that when out of synchronism some light from the picture exploring beam falls upon a cell, thereby accelerating or decelerating suitable speed devices. A common double-pole, double-throw switch may be used for reversing the auxiliary field coil provided the manual speed control is set for, say, under-speed and over-speed occurs due to variations of the characteristics of the apparatus, such as a weakening of the field produced by heating of the conductors, voltage drop of the excitation system or friction of the movable members, or when the speed control is very critical. In Fig. 25 the light controlled by the signal frequency should be directed upon either the upper or lower line of apertures, and the light from the explorer or controlled by any desired exploring or timing system periodically should be directed upon the lower line of apertures. Shadow views will ordinarily be about twice as bright as flat colored views. When the auxiliary mirror 272 is used with the explorer, as in Fig. 36, it may be concave, if desired, and the difference of the angles between adjacent mirrors on the explorer relative to the general plane of rotation need not be such as to produce a square view from the explorer itself, but to produce when coacting with the auxiliary mirror, a view either square or of other shape; in other words, the mirrors on the rotating explorer disk should be set at angles relative to each other so that the doubling of the angle is produced vertically regardless of which element receives the reflected rays, whereas the doubling of the horizontal angle may be produced by reflection on the adjacent element and a tripling of the angle by reflecting the rays to the secondly removed mirror or element.

Figure 38:
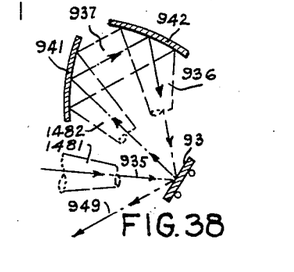

In Fig. 38 paraboloidal mirrors 941, 942, parallel the rays at 937 and refocus them to fall upon the mirror 93.

Figure 39:
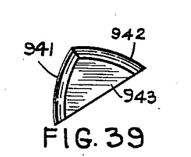
Fig. 39 is a detail of a prism for use in place of the concave mirrors of Fig. 38.

In Fig. 39 the paraboloidal surfaces 941, 942 of the glass prism 943 are silvered, this unit being designed to replace the mirrors shown in Fig. 38.

I claim:—

1. In radiographic apparatus, in combination, a source of light, an explorer, a photoelectric cell, electrical connections to said cell, a view comprising areas of different reflecting characteristics, means for directing rays from said source upon said explorer and from the explorer to said view, and means for directing rays from said view to said explorer and, thence, to said cell.

2. In radiographic apparatus, in combination, a source of light, an explorer, photoelectric means disposed to receive rays from said source distributed by said explorer, rotatable means having a plurality of sectors each comprising one or more complementary colors, said sectors being disposed in the path of said rays and coacting with said explorer, a photoelectric cell disposed to receive rays passing through said sectors, an electrical circuit including said cell, and means for varying the characteristics of said circuit simultaneously with the intersection of successive sectors with said rays.

3. In a radiographic receiver, in combination, means for directing a pencil of light rays at received signal frequency upon a photoelectric cell, means for directing a second pencil of light rays upon a second photoelectric cell at a frequency governed by the speed of projection of the optical system of the receiver, said cells being connected in opposition in a suitable electric circuit, said circuit being connected to motor speed-control means, said motor speed determining the speed of projection of successive areas of a given view.

4. In radiographic apparatus in which a chopper is employed in the transmitter for securing signals of a given frequency of picture point transmission, a receiver for reproducing said picture points at the same frequency, said receiver comprising a suitable explorer, a chopper for receiving rays dispersed by said explorer, said chopper having a plurality of alternate opaque bars and apertures designed to register in position with corresponding bars and apertures of the transmitter chopper when the receiver and transmitter are in step and synchronization.

5. The method of controlling the speed of an electric motor such as used in radiographic apparatus, which consists in varying the field excitation of the motor by means of the continuous application to said field of electric impulses of high frequency, of short and substantially equal duration and of variable intensity.

6. The method of controlling the speed of an electric motor such as used in radiographic apparatus, which consists in controlling the electrical energy input to said motor by means of electric energy impulses of variable intensity and equal duration.

7. In radiographic apparatus, the method of operation, which consists in transmitting electrical signals of predetermined duration and of variable intensity corresponding to areas making up a given view to be transmitted, receiving said signals, utilizing a portion of the energy of each of said signals for synchronizing purposes and another portion of the energy of each of said signals to control visual signals.

8. In radiographic apparatus, the method of operation, which consists in transmitting electrical signals of predetermined duration and of variable intensity corresponding to areas making up a given view to be transmitted, receiving said signals, dividing the energy of each of said signals into two portions having a fixed ratio, utilizing a portion of the energy of each of said signals for synchronizing purposes and the corresponding remaining portion of the energy of each of said signals to control visual signals.

9. In radiographic apparatus, the method of operation, which consists in transmitting at a given frequency electrical signals of predetermined duration and of variable intensity corresponding to areas making up a given view to be transmitted, and transmitting synchronizing electrical signals corresponding to, and of the same frequency as, the said signals corresponding to the areas.

10. In radiographic apparatus, the method of operation, which consists in transmitting in a single cycle an electrical signal of predetermined duration corresponding to one of a plurality of areas making up a given view to be transmitted and also transmitting in the same cycle a synchronizing signal.

11. In radiographic apparatus, the method of operation, which consists in transmitting in a given interval a complete image of a given view by means of a plurality of signals of predetermined duration each controlled by a corresponding small area of said view, receiving said signals and applying energy responsive to said signals repeatedly during said interval to control the speed of a motor.

12. The method of limiting the phase displacement of a local motor such as used in radiographic receiving apparatus and which is to run within given limits of phase and synchronism with respect to a distant motor, which consists in producing a great plurality of successive high-frequency signals each of a duration which is a function of the speed of the distant motor and of a strength which varies in accordance with an area of an image to be transmitted, applying said signals to control the speed of the local motor, and varying the strength of each signal to affect the speed of the local motor in accordance with simultaneous phase difference existing between the motors.

13. The method of limiting the phase displacement, at a local station, of a local motor such as used in radiographic receiving apparatus and which is to run closely in phase and closely in synchronism with respect to a distant motor at a distant station; which consists in producing at the distant station a great plurality of successive high-frequency signals in determinate order and of a duration which is a function of the speed of the distant motor; and at the local motor station receiving said signals, photoelectrically varying the strength of said signals substantially in accordance with simultaneous phase differences existing between the motors; and continuously and at high-frequency applying said varied signals to control the speed of the local motor.

14. The method of synchronizing radiographic apparatus, which comprises producing at the transmitting station a continuous series of electrical signals of predetermined duration, in determinate order and of a strength variable in accordance with areas of an image to be transmitted; and, at a receiving station, varying an electric current in consonance with said signals and in proportion to simultaneous phase displacements existing between the apparatuses in the two stations; and applying the varied current for synchronizing.

15. The method of limiting the phase displacement of a local motor such as used in radiographic receiving apparatus and which is to run within given limits of phase and synchronism with respect to a distant motor, which consists in producing a great plurality of successive high-frequency signals each of a duration which is a function of the speed of the distant motor, varying the instantaneous strength of the signals responsive to simultaneous phase difference of the motors, and applying energy controlled by the varied signals to affect the speed of the local motor.

16. The method of controlling the speed of an electric motor such as used in radiographic apparatus; which consists in varying the field excitation of the motor by the application, to the field coils of the motor, of a continuous series of high-frequency electrical impulses of short and substantially equal duration and of variable strength.

17. The method of controlling a motor such as used in radiographic apparatus, which consists in affecting the speed of the motor by the application to the motor of energy controlled by a continuous series of high-frequency photoelectric impulses of variable intensity and equal duration.

18. The method of controlling the speed of a motor such as used in radiographic apparatus; which consists in causing radiant energy to vary in intensity, at predetermined intervals and at a predetermined high-frequency; causing the varied radiant energy to produce variations in the intensity of photoelectric energy, at a high frequency; and applying the varied photoelectric energy to affect the motor speed.

19. The method of controlling the speed of a motor such as used in radiographic apparatus, which consists in applying to the motor energy controlled by impulses of equal duration and of variable intensity.

20. In a signaling system, the method of operation, which consists in the producing, at a transmitting station, of picture signals; producing also, at said station, additional signals having characteristics differing from those of the picture signals and which alternate with the picture signals; transmitting and receiving both classes of signals and applying both said classes of signals for simultaneously synchronizing and recording a picture at a receiving station.

21. In a signaling system, the method of operation, which consists in the producing, at a transmitting station, of picture signals in determinate sequence, producing additional signals at the same sequence, the said additional signals having characteristics differing from those of the picture signals, transmitting and receiving said signals, and applying both classes of signals for simultaneously synchronizing and recording a picture at a receiving station.

22. In a signaling system, the method of operation, which consists in receiving signals, each being derived from one of a small number of sources, successive signals being derived from corresponding successive sources, and applying said signals for synchronizing, and simultaneously recording a picture.

23. In a signaling system, the method of operation, which consists in transmitting signals successively derived from a corresponding one of a plurality of corresponding signal-control sources, and applying said signals for simultaneously synchronizing and recording a picture at a receiving station.

24. In a signaling system, the method of operation, which consists in producing a determinate number of series of signals, causing the signals of one series to alternate with the signals of correlated series, and applying the signals for simultaneously synchronizing and recording a picture at a distant station.

25. In a signaling system, the method of operation, which consists in deriving signals directly from a scanned device whose image is to be transmitted, and at a distant station, applying said signals for simultaneously synchronizing and recording said image.

26. In a signaling system, the method of operation, which consists in scanning a subject whose image is to be transmitted, deriving therefrom signals of determinate duration, and controlling correlated receiving apparatus by said signals, so as to record an image of said subject and simultaneously synchronize the receiving apparatus.

27. In a signaling system, the method of operation, which consists in producing in rapid succession a great plurality of pairs of signals, one signal in each pair being a picture signal and the other being a synchronizing signal.

28. In a signaling system, the method of operation, which consists in producing in rapid succession a great plurality of multipurpose signals of substantially equal duration, and causing said signals to actuate synchronizing and recording apparatus.

In testimony whereof I, PAUL L. CLARK, have signed my name to this specification this seventeenth day of January, 1927.

PAUL L. CLARK.